US011283118B2

(12) United States Patent
Yoo et al.

(10) Patent No.: US 11,283,118 B2
(45) Date of Patent: Mar. 22, 2022

(54) BATTERY MODULE INTEGRATED WITH BATTERY CELL COOLING AND FIXING STRUCTURE, AND BATTERY PACK INCLUDING SAME

(71) Applicant: LG Chern, Ltd., Seoul (KR)

(72) Inventors: Jae-Min Yoo, Daejeon (KR); Dal-Mo Kang, Daejeon (KR); Su-Chang Kim, Daejeon (KR); Jeong-O Mun, Daejeon (KR); Jae-Uk Ryu, Daejeon (KR); Ji-Su Yoon, Daejeon (KR)

(73) Assignee: LG Energy Solution, Ltd.

( * ) Notice: Subject to any disclaimer, the term of this patent is extended or adjusted under 35 U.S.C. 154(b) by 176 days.

(21) Appl. No.: 16/608,048

(22) PCT Filed: Sep. 27, 2018

(86) PCT No.: PCT/KR2018/011407
§ 371 (c)(1),
(2) Date: Oct. 24, 2019

(87) PCT Pub. No.: WO2019/083177
PCT Pub. Date: May 2, 2019

(65) Prior Publication Data
US 2020/0194853 A1 Jun. 18, 2020

(30) Foreign Application Priority Data
Oct. 27, 2017 (KR) .................... 10-2017-0141450

(51) Int. Cl.
*H01M 2/10* (2006.01)
*H01M 10/613* (2014.01)
*H01M 10/643* (2014.01)
*H01M 10/653* (2014.01)
*H01M 50/20* (2021.01)
*H01M 10/48* (2006.01)

(52) U.S. Cl.
CPC ....... *H01M 10/643* (2015.04); *H01M 10/613* (2015.04); *H01M 10/653* (2015.04); *H01M 50/20* (2021.01); *H01M 10/482* (2013.01)

(58) Field of Classification Search
CPC .. H01M 10/643; H01M 50/20; H01M 10/613; H01M 10/653; H01M 10/482; H01M 10/6555; Y02E 60/10
See application file for complete search history.

(56) References Cited

U.S. PATENT DOCUMENTS

| | | | |
|---|---|---|---|
| 2011/0090614 A1* | 4/2011 | Guerin | H01G 11/18 361/274.3 |
| 2011/0217587 A1* | 9/2011 | An | H01M 10/02 429/156 |
| 2012/0021260 A1 | 1/2012 | Yasui et al. | |
| 2013/0183566 A1 | 7/2013 | Wayne et al. | |
| 2015/0072217 A1 | 3/2015 | Kim et al. | |
| 2015/0118530 A1* | 4/2015 | Lee | H01M 10/482 429/82 |
| 2016/0181676 A1 | 6/2016 | Nubbe | |
| 2020/0227698 A1* | 7/2020 | Muratsu | H01M 50/572 |

FOREIGN PATENT DOCUMENTS

| | | |
|---|---|---|
| CN | 104993187 A | 10/2015 |
| DE | 102015016599 A1 | 6/2017 |
| JP | 2009295381 A | 12/2009 |
| JP | 2011508366 A | 3/2011 |
| JP | 2013110080 A | 6/2013 |
| JP | 2015228286 A | 12/2015 |
| KR | 20110099979 A | 9/2011 |
| KR | 20110118807 A | 11/2011 |
| KR | 101446148 B1 | 10/2014 |
| KR | 20150048501 A | 5/2015 |
| KR | 20170000125 U | 1/2017 |
| KR | 20170095971 A | 8/2017 |
| WO | 2016178315 A1 | 11/2016 |
| WO | 2017110036 A1 | 6/2017 |

OTHER PUBLICATIONS

International Search Report for Application No. PCT/KR2018/011407, dated Jan. 25, 2019, pp. 1-3.
Extended European Search Report including Written Opinion for Application No. EP18870832.5, dated Jul. 27, 2020, pp. 1-7.

* cited by examiner

*Primary Examiner* — Muhammad S Siddiquee
(74) *Attorney, Agent, or Firm* — Lerner, David, Littenberg, Krumholz & Mentlik, LLP

(57) ABSTRACT

A battery module includes a plurality of cylindrical battery cells and a first fixing frame configured to support the cylindrical battery cells so that the cylindrical battery cells are oriented vertically. The first fixing frame includes cell bottom holders provided at predetermined locations on a plate having a tray shape so that the cylindrical battery cells can be inserted therein in a vertical orientation; and perforation holes formed between the cell bottom holders so as to be open in a vertical direction, wherein the battery module comprises a thermally conductive adhesive solution introduced through the perforation holes from a lower portion of the first fixing frame to an upper portion thereof.

20 Claims, 5 Drawing Sheets

BATTERY MODULE INTEGRATED WITH BATTERY CELL COOLING AND FIXING STRUCTURE, AND BATTERY PACK INCLUDING SAME

CROSS-REFERENCE TO RELATED APPLICATIONS

This application is a national phase entry under 35 U.S.C. § 371 of International Application No. PCT/KR2018/011407 filed Sep. 27, 2018, which claims priority from Korean Patent Application No. 10-2017-0141450 filed on Oct. 27, 2017, the disclosures of which are incorporated herein by reference in their entirety.

TECHNICAL FIELD

The present disclosure relates to a battery module, and more particularly, to a battery module to which a new assembling structure for stably fixing cylindrical battery cells in the battery module and improving the cooling efficiency is applied, and a battery pack including the battery module.

BACKGROUND ART

Generally, a secondary battery refers to a battery that is capable of being charged and discharged, unlike a primary battery that is not able to be charged. The secondary battery is widely used in electronic devices such as mobile phones, notebook computers, camcorders, and electric vehicles. In particular, a lithium secondary battery has a larger capacity than a nickel-cadmium battery or a nickel-hydrogen battery, which is widely used as a power source for electronic equipment, and has a high energy density per unit weight. For this reason, the lithium secondary battery has been used more and more.

The lithium secondary battery may be classified into a can-type secondary battery, in which an electrode assembly is included in a metal can, and a pouch-type secondary battery, in which an electrode assembly is included in a pouch made of an aluminum sheet, depending on the shape of the exterior. Here, the can-type secondary battery may also be classified into a cylindrical battery and a rectangular battery, depending on the shape of the metal can.

Meanwhile, the pouch-type secondary battery has advantages of easy stacking and high energy density, but it is vulnerable to an external impact due to low mechanical rigidity. On the other hand, the can-type secondary battery is superior to the pouch-type secondary battery in terms of the durability against an external impact because of its excellent mechanical rigidity. Thus, in view of safety, the can-type secondary battery is evaluated as better than the pouch-type secondary battery.

However, when the can-type secondary batteries are used to make a mid-sized or large-sized battery module or pack, a large number of can-type secondary batteries are required to satisfy the demanded output voltage or charge/discharge capacity. However, it is difficult to effectively arrange and fix the can-type secondary batteries in a module case.

In addition, since the battery module is manufactured in such a manner that the can-type secondary batteries are densely packed in a narrow space, it is important to easily dissipate heat generated from each battery cell. Since the charging or discharging process of the battery cell is performed by electrochemical reactions, if the heat of the battery module generated during the charging and discharging process is not effectively removed, heat accumulation occurs, and as a result, the battery module degrades faster, thereby causing ignition or explosion on occasions. Thus, as disclosed in KR Unexamined Patent Publication No. 10-2011-0118807 (Nov. 11, 2011), as an example, a cooling device for cooling the battery cells is required particularly for a battery module with a large capacity.

DISCLOSURE

Technical Problem

The present disclosure is designed to solve the problems of the related art, and therefore the present disclosure is directed to providing a battery module to which a new assembling structure for stably fixing cylindrical battery cells in the battery module and improving the cooling efficiency is applied, and a battery pack including the battery module.

Technical Solution

In one aspect of the present disclosure, there is provided a battery module, which includes a plurality of cylindrical battery cells and a first fixing frame configured to support the cylindrical battery cells so that the cylindrical battery cells are oriented vertically, wherein the first fixing frame includes: cell bottom holders provided at predetermined locations on a plate having a tray shape so that the cylindrical battery cells are inserted therein one by one in a vertical orientation; and perforation holes formed between the cell bottom holders so as to open in a vertical direction, wherein the battery module comprises a thermally conductive adhesive solution introduced through the perforation holes from a lower portion of the first fixing frame to an upper portion thereof.

Each of the cell bottom holders may include a bottom insert hole formed so as to open in the vertical direction, each of the bottom insert holes corresponding to a diameter of a respective one of the cylindrical battery cells; and bottom periphery supports extending like a pillar with a curved surface positioned discontinuously at predetermined intervals along a circumferential direction of the bottom insert hole to partially support a bottom periphery of an outer circumference of the cylindrical battery cell.

The perforation holes and the bottom periphery supports may be alternately formed along the circumferential direction of each of the cylindrical battery cells.

The first fixing frame may further include bottom supports having one end horizontally extending from a lower surface of the first fixing frame to a location vertically below the bottom insert hole to support a portion of a lower surface of the cylindrical battery cell.

The bottom support may have several branches so that ends of the branches are disposed at locations vertically below a plurality of bottom insert holes adjacent to each other.

The battery module may further comprise a second fixing frame including cell top holders provided to cover respective top portions of the cylindrical battery cells at predetermined locations on a plate having a tray shape, the second fixing frame being coupled to the first fixing frame with the plurality of cylindrical battery cells being interposed therebetween.

Each of the cell top holders may have a top insert hole formed so as to open in the vertical direction, each of the top insert holes corresponding to a respective one of the bottom insert holes of the cell bottom holders.

The second fixing frame may further include a top support having one end horizontally extending from an upper surface of the second fixing frame to a location vertically above the top insert hole to support a portion of an upper surface of the cylindrical battery cell, such that, along with the bottom supports, the top supports restrict vertical movement of the cylindrical battery cells.

The battery module may further comprise a cooling tray having a container shape to accommodate the thermally conductive adhesive solution and the first fixing frame therein.

In another aspect of the present disclosure, there is also provided a battery pack, comprising the battery module described above.

Advantageous Effects

According to an embodiment of the present disclosure, it is possible to provide a battery module to which a new assembling structure for stably fixing cylindrical battery cells in the battery module and improving the cooling efficiency is applied.

More specifically, since a thermally conductive adhesive solution is introduced into the first fixing frame through the perforation holes of the first fixing frame from the outside to contact the outer circumference of the cylindrical battery cell, it is possible to significantly improve the cooling efficiency and the battery cell fixation.

According to another embodiment of the present disclosure, it is possible to provide a battery module with a stable structure since the vertical and lateral movement of the cylindrical battery cells is perfectly prevented by the first fixing frame and the second fixing frame.

The effects of the present disclosure are not limited to the above, and effects not mentioned herein may be clearly understood from the present specification and the accompanying drawings by those skilled in the art.

BEST MODE

Figure 1:
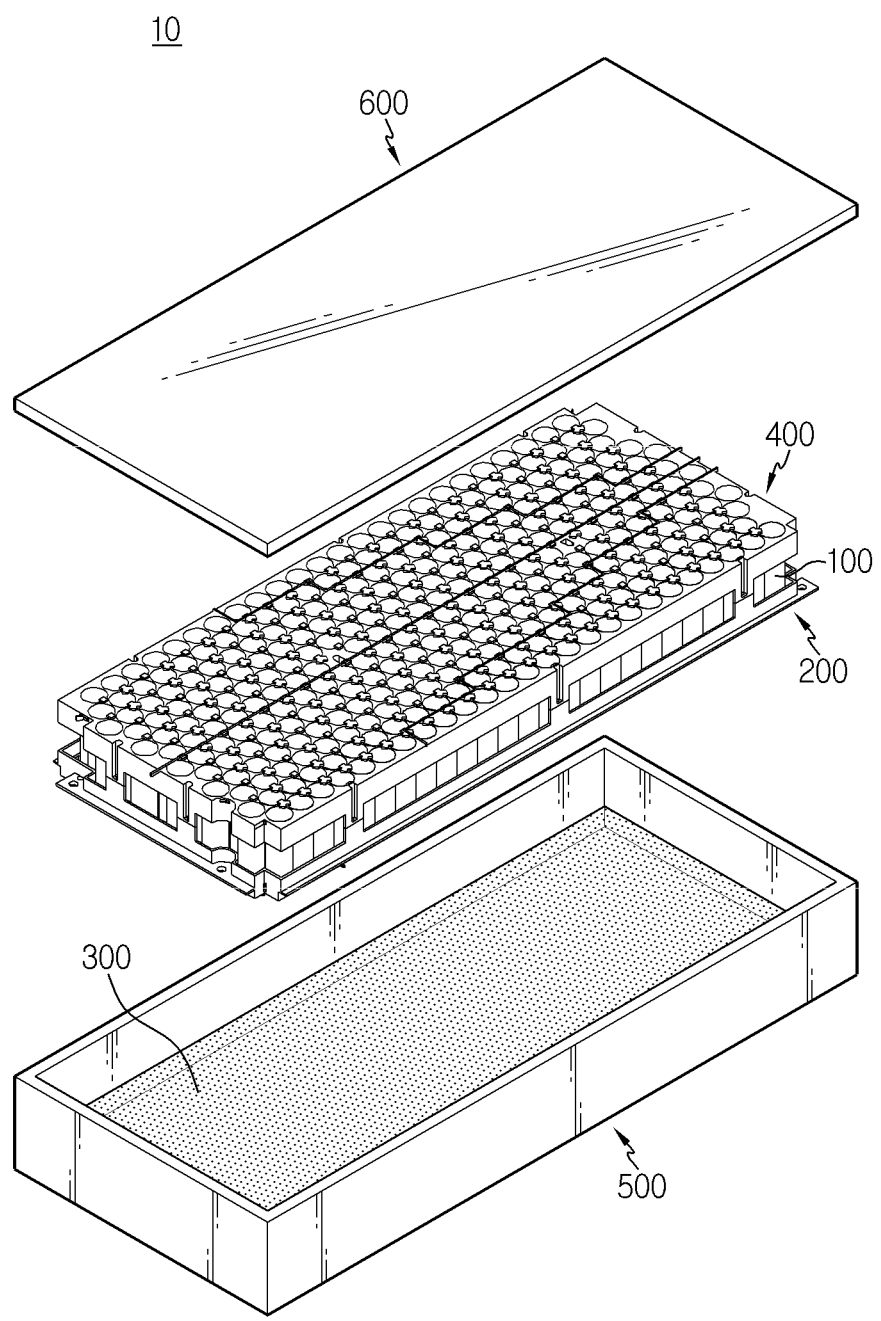
FIG. 1 is an exploded perspective view schematically showing a battery module according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but rather interpreted based on the meanings and concepts corresponding to technical aspects of the present disclosure, in view of the principle that the inventor is allowed to define terms appropriately for the best explanation.

Therefore, the description proposed herein is just a preferable example for the purpose of illustration only, not intended to limit the scope of the disclosure, so it should be understood that other equivalents and modifications could be made thereto without departing from the scope of the disclosure.

The embodiments disclosed herein are provided to better explain the present disclosure, and thus the shape and size (and the like) of components may be exaggerated, omitted or simplified in the drawings for better understanding. Thus, the size and ratio of components in the drawings do not wholly reflect the actual size and ratio.

Figure 2:
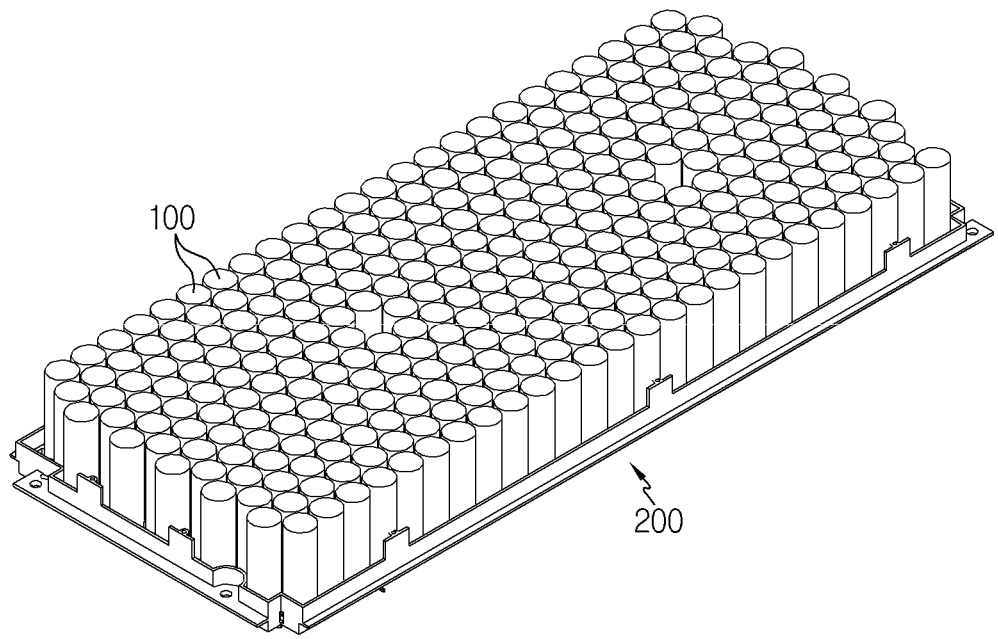
FIG. 2 is a perspective view showing cylindrical battery cells assembled to the first fixing frame of FIG. 1.
Figure 3:
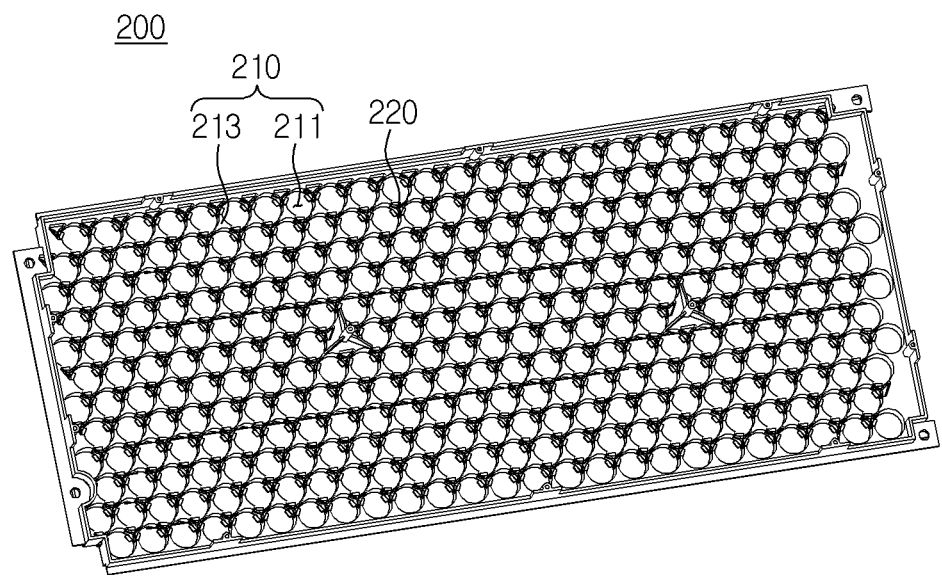
FIG. 3 is a perspective view showing the first fixing frame of FIG. 1.
Figure 4:
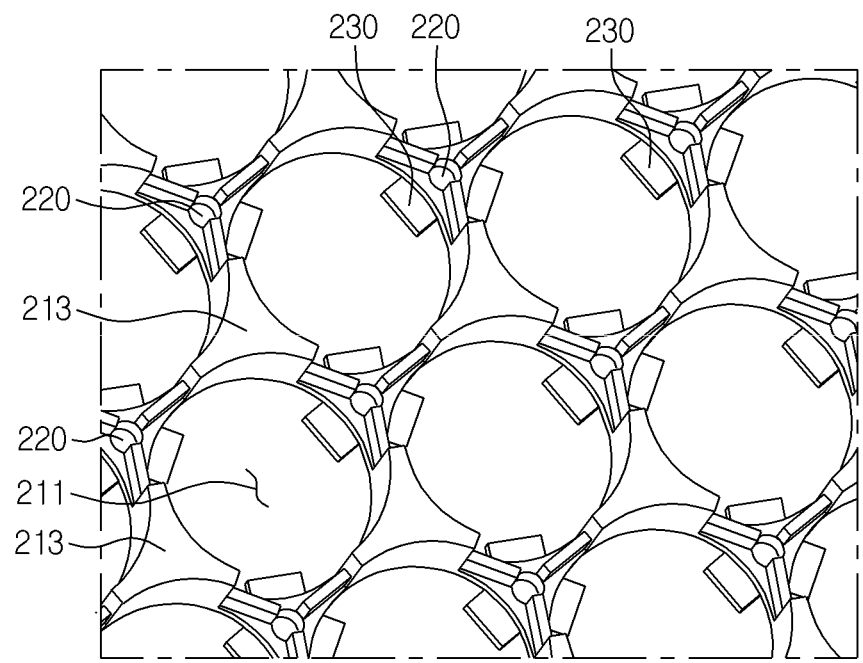
FIG. 4 is a partially enlarged view of FIG. 3.

FIG. 1 is an exploded perspective view schematically showing a battery module according to an embodiment of the present disclosure, FIG. 2 is a perspective view showing cylindrical battery cells assembled to the first fixing frame of FIG. 1, FIG. 3 is a perspective view showing the first fixing frame of FIG. 1, and FIG. 4 is a partially enlarged view of FIG. 3.

Referring to FIG. 1, a battery module 10 according to an embodiment of the present disclosure may include a plurality of cylindrical battery cells 100, a first fixing frame 200, a thermally conductive adhesive solution 300, a second fixing frame 400, a cooling tray 500, and a tray cover 600.

The cylindrical battery cells 100 included in the battery module 10 according to the present disclosure are a kind of can-type secondary batteries in which an electrode assembly is accommodated in a metal can. Although not shown in detail in the figures, the cylindrical battery cell 100 may include a cylindrical battery can, a jelly-roll type electrode assembly accommodated in the battery can, and a cap assembly coupled to an upper portion of the battery can. Here, the cylindrical battery can may be made of a lightweight conductive metal material such as aluminum, stainless steel or an alloy thereof.

The cylindrical battery cells 100 may be connected in series and/or in parallel, depending on the output and capacity demanded on the battery module 10. For example, the cylindrical battery cells 100 may be electrically connected in series and/or in parallel by a bus bar made of a copper plate.

Meanwhile, the scope of the present disclosure is not necessarily limited to the cylindrical battery cell 100, and as an alternative embodiment, the battery module 10 may include other can-type secondary batteries, for example rectangular battery cells.

The first fixing frame 200 is a structure for supporting and fixing bottoms of the cylindrical battery cells 100. As shown in FIG. 2, the cylindrical battery cells 100 may be disposed to stand vertically in a concentrated arrangement on the first fixing frame 200.

Specifically, the first fixing frame 200 will be described in detail with reference to FIGS. 3 and 4. The first fixing frame 200 includes cell bottom holders 210 provided at predetermined locations on a plate having a tray shape so that the cylindrical battery cells 100 are inserted therein one by one in a vertical orientation, perforation holes 220 formed in a vertical direction between the cell bottom holders 210, and a bottom support 230 provided at a lower surface of the plate.

First, the cell bottom holders 210 may include a bottom insert hole 211 and a bottom periphery support 213, respectively. The bottom insert hole 211 is shaped to correspond to the diameter of the cylindrical battery cell 100, and the bottom insert hole 200 passes through the plate-shaped surface of the first fixing frame 200 in the vertical direction. The bottom periphery support 213 may extend along the vertical direction and define a curved surface positioned discontinuously at predetermined intervals along a circumferential direction of the bottom insert hole 211. Here, the curved surface of the bottom periphery support 213 has a curvature corresponding to the outer circumference of the cylindrical battery cell 100.

The cylindrical battery cell 100 may be inserted into the bottom insert hole 211, and at this time, a bottom periphery of the outer circumference of the cylindrical battery cell 100 may be supported by the bottom periphery support 213. In particular, the bottom periphery support 213 of this embodiment rises discontinuously at predetermined intervals along the circumferential direction of the bottom insert hole 211 to partially surround the bottom periphery of the outer circumference of the cylindrical battery cell 100. According to this configuration, an empty space may be formed between the discontinuous bottom periphery supports 213 when the cylindrical battery cells 100 are assembled to the first fixing frame 200. Due to the empty space, the thermally conductive adhesive solution 300, explained later, may be easily diffused, and the contact area between the thermally conductive adhesive solution 300 and the outer circumference of the cylindrical battery cells 100 may be increased.

The cell bottom holders 210 are preferably provided on the plate-shaped surface of the first fixing frame 200 such that as many cylindrical battery cells 100 as possible are arranged per unit area of the first fixing frame 200 of a given size.

For example, as shown in FIG. 3, the bottom insert holes 211 may be densely arranged so that an equilateral triangle is formed when center points of three bottom insert holes 211 adjacent to each other are connected using imaginary straight lines. In addition, the bottom periphery support 213 may be formed in a pillar shape by three curved surfaces between three bottom insert holes 211, so that the three bottom insert holes 211 share one bottom periphery support 213. The bottom insert holes 211 and the bottom periphery supports 213 may be repeatedly formed along the plate of the first fixing frame 200 in this pattern to increase the density of the cell bottom holders 210.

Furthermore, the first fixing frame 200 according to the present disclosure may include a plurality of perforation holes 220 in addition to the bottom insert holes 211. The perforation holes 220 serve as passages through which the thermally conductive adhesive solution 300 is introduced from the outside, and the perforation holes 220 may be provided between the cell bottom holders 210, respectively.

Specifically, the perforation holes 220 may be arranged alternately with the bottom periphery supports 213 along the circumferential direction of each cylindrical battery cell 100. For example, as shown in FIG. 4, in this embodiment, three perforation holes 220 and three bottom periphery supports 213 may be alternately provided around one bottom insert hole 211.

Figure 5:
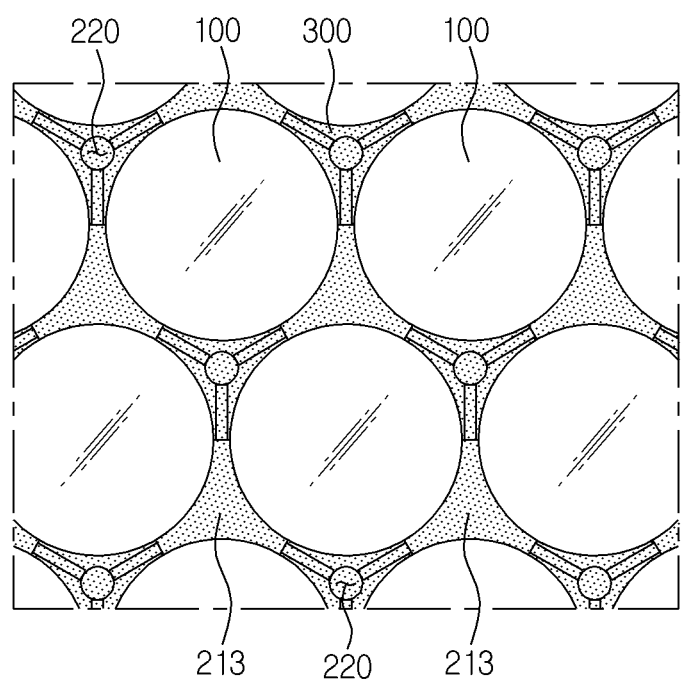
FIGS. 5 and 6 are diagrams for illustrating a process of putting a thermally conductive adhesive solution to the first fixing frame according to an embodiment of the present disclosure.
Figure 6:
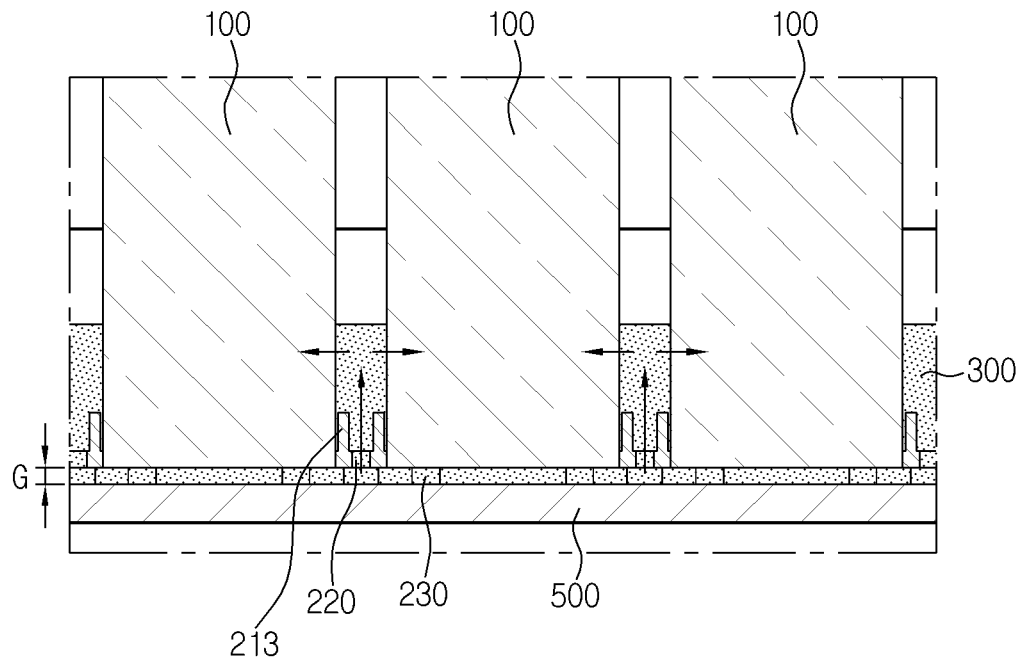

Referring to FIGS. 5 and 6, when the thermally conductive adhesive solution 300 is introduced upward from a lower portion of the first fixing frame 200 through the perforation holes 220, the first fixing frame 200 becomes filled with the thermally conductive adhesive solution 300 from the empty spaces between the three bottom edge supports 213, and may be filled with the thermally conductive adhesive solution to a location higher than the three bottom periphery supports 213, depending on the amount of the thermally conductive adhesive solution 300. In this case, the cylindrical battery cells 100 may be fixed by the thermally conductive adhesive solution 300, and the heat generated during charging and discharging may be rapidly dissipated to the outside through the thermally conductive adhesive solution 300.

The bottom support 230 supports a portion of the lower surface of the cylindrical battery cell 100 at a lower portion of the cylindrical battery cell 100. The bottom support 230 may be at the lower surface of the first fixing frame 200 and may extend horizontally into several branches so that one end of each branch is located vertically below a respective one of a plurality of bottom insert holes 211 disposed adjacent to each other.

In the embodiment of FIG. 4, the end of one bottom support 230 may extend into three branches between three bottom insert holes 211 so that each of the branched ends are positioned at a location vertically below a respective bottom insert hole 211. A plurality of bottom supports 230 may be repeatedly provided at the lower surface of the first fixing frame 200 in this pattern.

According to this construction, when the cylindrical battery cells 100 are inserted into the bottom insert holes 211 of the first fixing frame 200, since the bottom insertion holes 211 are open, the cylindrical battery cells 100 may be supported by the bottom support 230 in a state where their lower surfaces are exposed to the outside.

The cylindrical battery cells 100 are assembled to the first fixing frame 200 (see FIG. 1) to be placed on the upper surface of the cooling tray 500, and due to the presence of the bottom support 230, the cylindrical battery cells 100 will be spaced from the upper surface of the cooling tray 500 by the height of the bottom support 230. That is, a slight gap G may be formed between the lower surface of the cylindrical battery cells 100 and the upper surface of the cooling tray 500 as shown in FIG. 6. Since the gap G is filled with the thermally conductive adhesive solution 300, the contact resistance between the lower surface of the cylindrical battery cells 100 and the upper surface of the cooling tray 500 may be significantly reduced, so as to increase the thermal conductivity.

In addition, since the gap G is formed as described above, the thermally conductive adhesive solution 300 can be introduced more smoothly through the perforation holes 220 of the first fixing frame 200 from the lower portion to the upper part of the first fixing frame 200, thereby further improving the cooling efficiency and fixation of the cylindrical battery cells 100.

The thermally conductive adhesive solution 300 is a material simultaneously having thermal conductivity and adhesive properties. The thermally conductive adhesive solution 300 serves to transmit the heat of the cylindrical battery cell 100 to a cooling medium, such as the cooling tray 500, and to fix the first fixing frame 200 and the cylindrical battery cells 100 together.

For example, the thermally conductive adhesive solution 300 may be an epoxy resin or a silicon resin. However, the scope of the present disclosure is not limited to the epoxy resin or the silicone resin, and the thermally conductive adhesive solution 300 of the present disclosure may employ any adhesive solution or an adhesive having both thermal conductivity and adhesive properties.

The battery module 10 (see FIG. 1) of the present disclosure may be assembled such that the cylindrical battery cells 100 and the first fixing frame 200 are accommodated in the cooling tray 500 filled with the thermally conductive adhesive solution 300 as described above. At such time, the first fixing frame 200 may become adhered and fixed to the cooling tray 500 by the thermally conductive adhesive solution 300 without a separate mounting part, and the outer circumferences of the cylindrical battery cells 100 may contact the thermally conductive adhesive solution 300 introduced through the perforation holes 220 of the first fixing frame 200.

According to the properties of the thermally conductive adhesive solution 300 and the first fixing frame 200 as described above, even though the first fixing frame 200 is a plastic injection-molded material with low thermal conductivity and high surface roughness with high contact resistance to the cooling tray 500, the first fixing frame 200 may penetrate the cooling tray 500 to transfer the heat of the cylindrical battery cells 100 to the cooling tray 500 quickly, thereby stably fixing the cylindrical battery cells 100 and significantly improving the cooling efficiency.

Next, the second fixing frame 400 will be described with reference to FIGS. 7 and 8. Since the first fixing frame 200 has a structure similar to the second fixing frame 400, the features identical to the first fixing frame 200 will not be described in detail.

Figure 7:
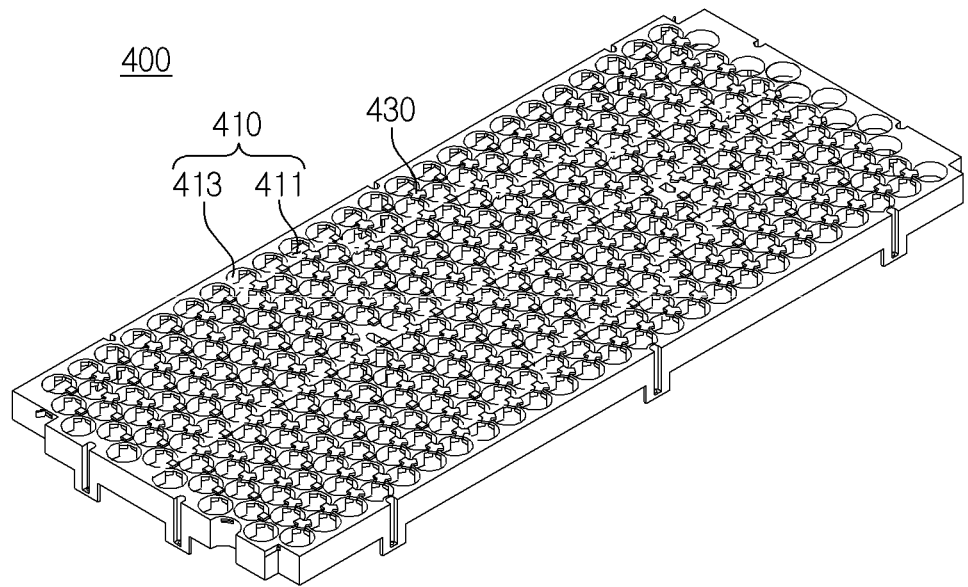
FIG. 7 is a perspective view showing the second fixing frame of FIG. 1.
Figure 8:
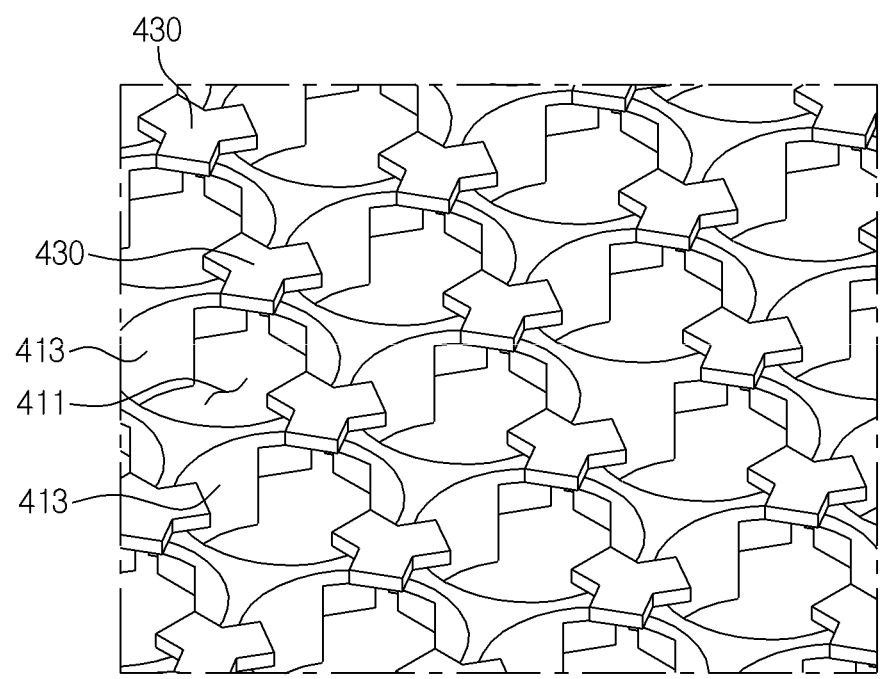
FIG. 8 is a partially enlarged view of FIG. 7.

FIG. 7 is a perspective view showing the second fixing frame of FIG. 1, and FIG. 8 is a partially enlarged view of FIG. 7.

The second fixing frame 400 may be vertically coupled with the first fixing frame 200 (see FIG. 1) at a rim portion thereof by snap-fitting or bolt fastening while the cylindrical battery cells 100 are interposed therebetween.

The second fixing frame 400 is a tray-shaped structure for supporting and holding the top portions of the cylindrical battery cells 100. The structure of the second fixing frame 400 may correspond to the first fixing frame 200, except for the perforation holes 220.

Specifically, referring to the figures, the second fixing frame 400 may include cell top holders 410 and top supports 430, which are placed at respective predetermined positions at the top portions of the cylindrical battery cells 100.

Each of the cell top holders 410 may include a top insert hole 411 formed in the vertical direction, such that each corresponds to one of the bottom insert holes 211 of the cell bottom holders 210, and each of the cell top holders 410 may include a top periphery support 413 such that each corresponds to one of the bottom periphery supports 213.

Due to the configuration of the cell top holder 410, the top end of the cylindrical battery cell 100 may be inserted into the top insert hole 411, and the outer circumference thereof may be supported by the top periphery support 413.

One end of each top support 430 extends horizontally from the upper surface of the second fixing frame 400 to a location vertically above a respective top insert hole 411 so as to support a portion of the upper surface of the cylindrical battery cell 100, thereby, along with the bottom support 230, restricting vertical movement of the cylindrical battery cell 100.

The top support 430 may be formed to extend into several branches such that one end of each branch of the top support 430 is located vertically above a respective one of the plurality of top insert holes 411 adjacent to each other, in the same pattern as the bottom support 230. That is, one top support 430 may be positioned at the center of three top insert holes 411 and extend into three branches.

In addition, the top support 430 may be structured to support only a portion of the upper surface of the cylindrical battery cell 100 so that the upper surface of the cylindrical battery cell 100 is mostly exposed out of the top insert hole 411. In this case, electrical connecting parts such as a bus bar may be easily mounted to the upper surface of the cylindrical battery cell 100 exposed out of the top insert hole 411.

If the second fixing frame 400 of an embodiment configured as above is used together with the first fixing frame 200, the vertical and horizontal movement of the cylindrical battery cells 100 may be perfectly blocked. That is, the horizontal movement of the cylindrical battery cells 100 may be blocked by the cell top holders 410 and the cell bottom holders 210 between the first fixing frame 200 and the second fixing frame 400, and the vertical movement may be blocked by the top support 430 and the bottom support 230. According to the present disclosure, since the cylindrical battery cells 100 are stably fixed to the first fixing frame 200 and the second fixing frame 400 as a whole, it is possible to provide a battery module 10 that is structurally and electrically stable against an external impact.

Meanwhile, as described above, the cooling tray 500 may be a structure having a container shape with an accommodation space for accommodating the thermally conductive adhesive solution 300, the first fixing frame 200, the cylindrical battery cells 100 and the second fixing frame 400 vertically coupled to the first fixing frame 200 with the cylindrical battery cells 100 being interposed therebetween.

The cooling tray 500 has a generally wide, flat and sealed bottom surface and may be provided to be filled with the thermally conductive adhesive solution 300 to a preset height. In addition, the cooling tray 500 may be made of a metal material having excellent thermal conductivity to absorb the heat of the cylindrical battery cells 100. The cooling tray 500 may be coupled to the tray cover 600 to shield the accommodation space so that the cylindrical battery cells 100 are protected from the outside. Although not shown in the figures, a heatsink may be disposed at the lower portion of the cooling tray 500.

The heatsink is a component that indirectly cools the cylindrical battery cells 100 by allowing a coolant to pass through an inner flow path thereof to absorb the heat from the cooling tray 500 by means of thermal contact, and the heatsink may be disposed in contact with the lower surface of the cooling tray 500. The coolant flowing in the flow path is not particularly limited as long as it may easily flow through the flow path and is excellent in cooling ability. For example, the coolant may be water that may maximize cooling efficiency due to a high latent heat. However, the coolant may employ an antifreeze, a gas refrigerant, air, or the like, which may flow, without being limited to the above.

A battery pack according to the present disclosure may include at least one battery module 10 of the present disclosure. In addition to the battery module 10, the battery pack according to the present disclosure may further include a pack case for accommodating the battery module 10, and various devices for controlling charge and discharge of the battery module 10 such as a battery management system (BMS), a current sensor, a fuse or the like.

The battery module 10 according to the present disclosure may be applied to a vehicle such as an electric vehicle or a hybrid electric vehicle, or a power storage system (ESS).

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or an object to be observed.

What is claimed is:

1. A battery module, comprising:
a plurality of cylindrical battery cells; and
a first fixing frame configured to support the cylindrical battery cells so that the cylindrical battery cells are oriented vertically, wherein the first fixing frame includes:
a plurality of cell bottom holders provided at predetermined locations on a plate having a tray shape, each of the cell bottom holders being configured to receive a respective one of the cylindrical battery cells inserted therein in a vertical orientation; and
a plurality of perforation holes formed between the cell bottom holders so as to open in a vertical direction,
wherein the battery module comprises a thermally conductive adhesive solution that affixes the plurality of cylindrical battery cells within the respective cell bottom holders, the thermally conductive adhesive solution extending through the perforation holes from a lower portion of the first fixing frame to an upper portion thereof.

2. The battery module according to claim 1, wherein each of the cell bottom holders includes:
a bottom insert hole formed so as to open in the vertical direction, each of the bottom insert holes corresponding to a diameter of a respective one of the cylindrical battery cells; and
a plurality of bottom periphery supports extending along the vertical direction to define a curved surface positioned discontinuously at predetermined intervals along a circumferential direction of the bottom insert hole, so as to partially support a bottom periphery of an outer circumference of the cylindrical battery cell.

3. The battery module according to claim 2,
wherein the perforation holes and the bottom periphery supports are alternately formed along the circumferential direction of each of the bottom insert holes.

4. The battery module according to claim 2,
wherein the first fixing frame further includes a plurality of bottom supports, each having at least one end horizontally extending from a lower surface of the first fixing frame to a location vertically below a respective one of the bottom insert holes, so as to support a portion of a lower surface of the cylindrical battery cell.

5. The battery module according to claim 4,
wherein each of the bottom supports has a plurality of branches, each branch defining one of the ends, such that each end of the branches of any one of the bottom supports is disposed at a location vertically below a respective one of a plurality of bottom insert holes positioned adjacent to each other.

6. The battery module according to claim 4, further comprising:
a second fixing frame including a plurality of cell top holders provided to cover respective top portions of the cylindrical battery cells at predetermined locations on a second plate having a tray shape, the second fixing frame being coupled to the first fixing frame with the plurality of cylindrical battery cells being interposed therebetween.

7. The battery module according to claim 6,
wherein each of the cell top holders has a top insert hole formed so as to open in the vertical direction, each of the top insert holes corresponding to a respective one of the bottom insert holes of the cell bottom holders.

8. The battery module according to claim 7,
wherein the second fixing frame further includes a plurality of top supports, each having at least one end horizontally extending from an upper surface of the second fixing frame to a location vertically above a respective one of the top insert holes, so as to support a portion of an upper surface of the cylindrical battery cell, such that, along with the bottom supports, the top supports restrict vertical movement of the cylindrical battery cells.

9. The battery module according to claim 1, further comprising:
a cooling tray having a container shape to accommodate the thermally conductive adhesive solution and the first fixing frame therein.

10. A battery pack, comprising the battery module according to claim 1.

11. The battery module according to claim 9, wherein the first fixing frame is structured to space the cylindrical battery cells vertically upward from an upper surface of the cooling tray.

12. A battery module for accommodating a plurality of cylindrical battery cells, comprising:
a first fixing frame configured to support the cylindrical battery cells so that the cylindrical battery cells are oriented vertically, wherein the first fixing frame includes:
a plurality of cell bottom holders provided at predetermined locations on a plate having a tray shape, each of the cell bottom holders being configured to receive a respective one of the cylindrical battery cells inserted therein in a vertical orientation; and
a plurality of perforation holes formed between the cell bottom holders so as to open in a vertical direction,
wherein the battery module comprises a thermally conductive adhesive solution introduced through the perforation holes from a lower portion of the first fixing frame to an upper portion thereof,
wherein each of the cell bottom holders includes:
a bottom insert hole formed so as to open in the vertical direction, each of the bottom insert holes corresponding to a diameter of a respective one of the cylindrical battery cells; and
a plurality of bottom periphery supports extending along the vertical direction to define a curved surface positioned discontinuously at predetermined intervals along a circumferential direction of the bottom insert hole, so as to partially support a bottom periphery of an outer circumference of the cylindrical battery cell, and
wherein the first fixing frame further includes a plurality of bottom supports, each having at least one end horizontally extending from a lower surface of the first fixing frame to a location vertically below a respective one of the bottom insert holes, so as to support a portion of a lower surface of the cylindrical battery cell.

13. The battery module according to claim 12,
wherein the perforation holes and the bottom periphery supports are alternately formed along the circumferential direction of each of the bottom insert holes.

14. The battery module according to claim 12,
wherein each of the bottom supports has a plurality of branches, each branch defining one of the ends, such that each end of the branches of any one of the bottom supports is disposed at a location vertically below a respective one of a plurality of bottom insert holes positioned adjacent to each other.

15. The battery module according to claim 12, further comprising:
a second fixing frame including a plurality of cell top holders provided to cover respective top portions of the cylindrical battery cells at predetermined locations on a second plate having a tray shape, the second fixing frame being coupled to the first fixing frame with the plurality of cylindrical battery cells being interposed therebetween.

16. The battery module according to claim 15,
wherein each of the cell top holders has a top insert hole formed so as to open in the vertical direction, each of the top insert holes corresponding to a respective one of the bottom insert holes of the cell bottom holders.

17. The battery module according to claim 16,
wherein the second fixing frame further includes a plurality of top supports, each having at least one end horizontally extending from an upper surface of the second fixing frame to a location vertically above a respective one of the top insert holes, so as to support a portion of an upper surface of the cylindrical battery cell, such that, along with the bottom supports, the top supports restrict vertical movement of the cylindrical battery cells.

18. The battery module according to claim 12, further comprising:
a cooling tray having a container shape to accommodate the thermally conductive adhesive solution and the first fixing frame therein.

19. The battery module according to claim 18, wherein the first fixing frame is structured to space the cylindrical battery cells vertically upward from an upper surface of the cooling tray.

20. A battery pack, comprising the battery module according to claim 12.

* * * * *

UNITED STATES PATENT AND TRADEMARK OFFICE
CERTIFICATE OF CORRECTION

| | |
|---|---|
| PATENT NO. | : 11,283,118 B2 |
| APPLICATION NO. | : 16/608048 |
| DATED | : March 22, 2022 |
| INVENTOR(S) | : Jae-Min Yoo et al. |

It is certified that error appears in the above-identified patent and that said Letters Patent is hereby corrected as shown below:

On the Title Page

Item "(71) Applicant" delete "LG Chern, Ltd." insert --LG Chem, Ltd--

Signed and Sealed this
Seventeenth Day of May, 2022

Katherine Kelly Vidal
*Director of the United States Patent and Trademark Office*